(12) United States Patent
Yang et al.

(10) Patent No.: US 11,910,735 B2
(45) Date of Patent: Feb. 27, 2024

(54) TWO-WAY SOIL CLEARING DEVICE FOR SINGLE-RIDGE GRAPEVINE AND A CONSTRUCTION MACHINE FOR MOUNTING THE DEVICE

(71) Applicant: Jiangsu University, Jiangsu (CN)

(72) Inventors: Qizhi Yang, Jiangsu (CN); Mingsheng He, Jiangsu (CN); Xiaoqi Zhao, Jiangsu (CN); Aiping Shi, Jiangsu (CN); Wen Li, Jiangsu (CN); Lei Shi, Jiangsu (CN); Guangyu Du, Jiangsu (CN); Wenxuan Du, Jiangsu (CN)

(73) Assignee: JIANGSU UNIVERSITY, Jiangsu (CN)

( * ) Notice: Subject to any disclaimer, the term of this patent is extended or adjusted under 35 U.S.C. 154(b) by 32 days.

(21) Appl. No.: 17/042,697

(22) PCT Filed: Feb. 20, 2020

(86) PCT No.: PCT/CN2020/075914
§ 371 (c)(1),
(2) Date: Sep. 28, 2020

(87) PCT Pub. No.: WO2021/103324
PCT Pub. Date: Jun. 3, 2021

(65) Prior Publication Data
US 2023/0102263 A1    Mar. 30, 2023

(30) Foreign Application Priority Data

Nov. 29, 2019  (CN) .......................... 201911200932.X
Dec. 30, 2019  (CN) .......................... 201911394914.X
Feb. 10, 2020  (CN) .......................... 202010084056.5

(51) Int. Cl.
*A01B 39/16*    (2006.01)
*A01B 39/22*    (2006.01)
*A01B 39/24*    (2006.01)

(52) U.S. Cl.
CPC .............. *A01B 39/16* (2013.01); *A01B 39/22* (2013.01); *A01B 39/24* (2013.01)

(58) Field of Classification Search
CPC ..... A01B 39/16; A01B 39/163; A01B 39/166; A01B 39/22; A01B 39/24
See application file for complete search history.

(56) References Cited

U.S. PATENT DOCUMENTS 2,611,309 A * 9/1952 Crain ...................... A01B 39/16
                                                     172/709
3,604,513 A * 9/1971 Tassone .................. A01B 39/16
                                                     172/667
(Continued)

FOREIGN PATENT DOCUMENTS

CN        204482237 U      7/2015
CN        106034418 A     10/2016
(Continued)

*Primary Examiner* — Thomas B Will
*Assistant Examiner* — Joel F. Mitchell
(74) *Attorney, Agent, or Firm* — SALIWANCHIK, LLOYD & EISENSCHENK (57) ABSTRACT

A two-way soil clearing device for single-ridge grapevine and a construction machine for mounting the device, comprising a frame part, a soil clearing mechanism, a distance measuring sensor, an expansion and contraction device and a control unit; the frame comprises a left side frame and a right side frame; the left side frame and the right side frame are provided with a soil clearing mechanism respectively and expansion and contraction devices; the distance measuring sensor is provided in front of the soil clearing mechanism; and the control unit is respectively connected with the distance measuring sensor and the expansion and (Continued)

contraction device. The present invention can flexibly remove the covering soil between the piles of the grapevine and the covering soil at the side of the grapevine at one time, and can operate on both sides of the same soil ridge at the same time during work.

4 Claims, 4 Drawing Sheets

(56) References Cited

U.S. PATENT DOCUMENTS

| | | | | |
|---|---|---|---|---|
| 3,955,626 | A * | 5/1976 | Taylor | A01B 39/16 172/6 |
| 4,255,922 | A * | 3/1981 | Hiyama et al. | A01D 46/28 47/1.7 |
| 4,567,689 | A * | 2/1986 | Lemons | A01B 39/16 172/6 |
| 5,031,705 | A * | 7/1991 | Clemens | A01G 17/00 172/6 |
| 9,894,826 | B2 * | 2/2018 | Lysaght | A01B 39/28 |
| 10,448,571 | B1 * | 10/2019 | McFarland et al. | A01G 17/026 |

FOREIGN PATENT DOCUMENTS

| | | |
|---|---|---|
| CN | 108337934 A | 7/2018 |
| CN | 108848695 A | 11/2018 |
| DE | 4201897 A1 | 7/1993 |

* cited by examiner

TWO-WAY SOIL CLEARING DEVICE FOR SINGLE-RIDGE GRAPEVINE AND A CONSTRUCTION MACHINE FOR MOUNTING THE DEVICE

CROSS REFERENCE TO RELATED APPLICATIONS

This application is a National Stage Application of International Application Number PCT/CN2020/075914, filed Feb. 20, 2020; which claims priority to Chinese Application No. 201911200932.X, filed Nov. 29, 2019, No. 201911394914.X, filed Dec. 30, 2019, and No. 202010084056.5, filed Feb. 10, 2020.

TECHNICAL FIELD

The present invention belongs to the research field of agricultural machinery. Specifically, the present invention relates to a two-way soil clearing device for a single-ridge grapevine and construction machinery for mounting the soil clearing device.

BACKGROUND ART

In recent years, the grape industry in China is developing rapidly. The planting area of grape ranks second in the world, and it has become the first grape producing country in the world. The main planting areas are concentrated in the Northwest of China. In the Northwest of China, the climate of winter is cold and dry, in order to prevent the grapevines from drying and frosting, the most common method currently adopted is to bury grapevines in winter, that is, the grapevines are laid down and buried with soil at the beginning of winter, the soil on the grapevines is removed after the winter. However, this work requires a lot of labor. Moreover, the grapevines will germinate in the spring when temperature and humidity reach to a certain level. If the soil clearing is not completed before the germination of the grapevines, the buds will be inevitably damaged when clearing soil and the production will be affected. At present, the work of soil clearing mainly relies on manual labor, which requires heavy workload, high labor intensity and high labor costs. This not only restricts the development of the grape industry, but also greatly reduces the income of grape growers. Therefore, it is of great importance to develop related machinery for clearing soil for grapevines.

Due to the obstacles of piles and iron wires which facilitate the climbing of the grapes in the vineyard, the existing soil clearing machinery mainly cleans the soil from one side of the grapevines, and the operation efficiency is low. Moreover, most of the soil clearing machines now have no power and are suspended behind the traditional tractor.

Due to some limitations on the structure of the current tractor, the transmission efficiency is low and the failure rate is high. For example, the patent application CN206948826U removes the soil above the grapevines and the soil at one side of the grapevine through the side scraper and the scraper between the piles; and the patent CN207573854U removes the soil at one side of the grapevine through the impeller soil cleaning mechanism. However, there are some limitations in the practice process. They cannot remove the covering soil on both sides of the ridge at the same time, and they can only work on one side of the ridge at a time, and they need to be suspended behind the tractor to work, which results in low work efficiency, and the depth of soil clearing cannot be adjusted automatically. If the depth of the soil clearing is too deep, the roots of grapevine will be damaged, and if the depth of the soil clearing is too shallow, the soil clearing rate will be low, which also has higher skill requirements for drivers.

CONTENTS OF THE INVENTION

In view of the above technical problems, the present invention provides a two-way soil clearing device for a single-ridge grapevine, which can work on both sides of ridge at one time to remove soil and automatically adjust the depth of soil clearing by controlling the soil clearing mechanism, so as to avoid the situation of deep soil clearing that damages the roots of grapevine and avoid the situation of shallow soil clearing that results in low soil clearing rate.

The present invention also provides a construction machine for mounting the two-way soil clearing device for a single-ridge grapevine, the construction machine is a riding type soil clearing machine, and the seat, steering mechanism and driving walking system are all mounted on the frame of the soil clearing device.

The present invention can effectively solve the problems of the soil clearing machine combined with the existing traditional tractor, such as small ground clearance, low transmission efficiency, high failure rate and inability to perform two-way soil clearing at one time. The driver can drive the soil clearing machine, and remove the covering soil over the grapevine through the scraper on the soil clearing machine, to achieve two-way soil clearing on both sides of the same soil ridge. At the same time, the real-time distance measurement function of the distance measuring sensor is used to make the scraper automatically adjust the depth of soil clearing, and try to avoid that the soil clearing is too deep to damage the grapevine roots. The present invention realizes the obstacle avoidance function of the scraper through the reset mechanism.

In the present invention, the left side frame and right side frame can be longitudinally combined into one body by disassembling the connecting device when the soil clearing machine is not working, which provides convenience for the driver to operate.

The present invention is a riding type two-way soil clearing machine for a single-ridge grapevine with simple structure and high soil clearing efficiency, which improves the soil clearing efficiency, avoids damage to the grapevines, and clears the soil over the grapevines as much as possible at the same time.

The technical solution adopted by the present invention to solve the technical problems thereof is: a two-way soil clearing device for a single-ridge grapevine, comprising a frame part, a soil clearing mechanism, a distance measuring sensor, an expansion and contraction device and a control unit;

the frame part includes a frame and a connecting device; the frame includes a left side frame and a right side frame; the left side frame and the right side frame are laterally connected by the connecting device;

the left side frame and the right side frame are respectively provided with a soil clearing mechanism;

the distance measuring sensor is arranged in front of the soil clearing mechanism; the left side frame and the right side frame are respectively provided with expansion and contraction devices, one end of the expansion and contraction device is connected with the frame at which side the expansion and contraction device is located and the other end of the expansion and contraction device is connected with the soil clearing mechanism;

the control unit is connected to the distance measuring sensor and the expansion and contraction device, respectively.

In the above solution, the soil clearing mechanism includes a scraper and a reset mechanism;

the upper part of the scraper is rotatably connected to the frame at which side the scraper is located;

the reset mechanism is mounted on the upper part of the scraper, and when the scraper is rotated by external force, the reset mechanism resets the scraper.

Furthermore, the reset mechanism includes a torsional spring, a base plate and a cylindrical pin;

the two ends of the cylindrical pin are rotatably connected to the through-holes at one end of the base plate respectively; the other end of the base plate is connected to the scraper;

the torsional spring is sleeved over the cylindrical pin.

Furthermore, the through-hole at one end of the base plate is a longitudinally arranged through-groove.

Furthermore, the soil clearing mechanism also includes a chute plate;

the chute plate is provided on the top of the scraper, the top of the scraper is slidingly connected with the chute at the bottom of the chute plate, and the reset mechanism is connected with the chute plate.

In the above solution, the connecting device is a gantry frame structure.

In the above solution, the left side frame and the right side frame are detachably connected in the longitudinal direction.

An engineering machine, comprising the two-way soil clearing device for a single-ridge grapevine.

The above solution also includes a seat, a steering mechanism and a driving walking system;

The seat, the steering mechanism and the driving walking system are all mounted on the frame.

The above solution also includes a wind power device; the wind outlet of the wind power device is located behind the soil clearing mechanism.

Compared with the prior art, the beneficial effects of the present invention are:

1. The present invention has designed a double-frame mechanism, which is connected by a connecting device, which can simultaneously remove the soil on both sides of the soil ridge, reducing the labor intensity of the operation and improving the operation efficiency, and when the soil clearing device is not working, the left side frame and right side frame can be assembled into one whole frame in the longitudinal direction. The front wheel of the right side frame is a universal wheel, the steering of the right side is provided by controlling the steering wheel of the left side soil clearing machine, which provides convenience for the driver to operate;

2. The scraper of the soil clearing mechanism of the present invention is provided with a reset mechanism. The scraper can swing to avoid when subjected to a large resistance, and return to its original state and continue to work when subjected to a small resistance, which not only effectively removes the covering soil and ensures the safety of the scraper, but also ensures the stability of the frame;

3. The distance measuring sensor is used to measure the distance between the scraper and the soil ridge in real time, and the depth of the scraper into the soil is adjusted through the expansion and contraction device, so that the scraper automatically adjusts the depth of soil clearing, trying to avoid the damage of the grapevine roots by the deep soil clearing, which can improve the covering soil clearing rate, and the damage rate of the grapevines is reduced at the same time, and the degree of intelligence is higher;

4. The present invention can be well combined with the wind-blown type soil clearing device, which not only creates favorable conditions for the wind-blown type soil clearing device, but also reduces the labor intensity of the subsequent grapevine digging operation.

BRIEF DESCRIPTION OF DRAWINGS

The above and/or additional aspects and advantages of the present invention will become apparent and readily understood from the description of the embodiments in combination with the drawings below, in which.

In the figures: 1—frame part, 2—seat, 3—steering mechanism, 4—soil clearing mechanism, walking system, 6—distance measuring sensor, 7—mounting frame, 8—depth limiting mechanism, 9—telescopic electric cylinder, 10—pallet, 11—fixed mounting plate, 101—left side frame, 102—connecting device, 103—right side frame, 301—steering wheel, 302—sleeve, 303—front wheel rod, 304—front wheel, 401—lifting lug, 402—torsional spring, 403—cylindrical pin, 404—base plate, 405—chute plate, 406—scraper, 501—exhaust fan, 502—diesel engine, 503—fixing plate, 504—belt pulley I, 505—belt, 506—belt pulley II, 507—transmission shaft, 508 gearbox, 801—support rod connector, 802—support rod, 803—driving wheel, 804—elastic component, 805—telescopic shaft, 806—butterfly nut.

EMBODIMENTS

Hereunder the embodiments of the present invention will be described in details, and examples of the embodiments are shown in the drawings, wherein in the context, the same or similar reference numerals are used to refer to the same or similar elements or elements having the same or similar functions. The embodiments described below with reference to the drawings are exemplary, which are intended to explain the invention and should not be construed as limiting the present invention.

In the description of the present invention, it should be appreciated that terms indicating the orientation or positional relationship, such as "center", "longitudinal", "transverse", "length", "width", "thickness", "upper", "lower", "axial", "radial", "vertical", "horizontal", "inside", "outside", and etc., are based on the orientation or positional relationship shown in the drawings, which are only used to facilitate the description of the present invention and to simplify the description, and are not intended to indicate or imply that the referred device or element has a particular orientation, or is constructed and operated in a particular orientation, thus these descriptions are not to be construed as limiting to the present invention. Moreover, the terms "first" and "second" are only used for descriptive purposes and are not to be construed as indicating or implying a relative importance or implicitly indicating the number of the indicated technical features. Thus, features defining "first" and "second" may include one or more of the features either explicitly or implicitly. In the description of the present invention, the meaning of "a plurality" is two or more, unless otherwise specifically defined.

In the present invention, terms such as "mount", "connect", "couple", and "fix" should be understood broadly, unless otherwise explicitly stated and defined. For example, it may be a fixed connection, a detachable connection, or an integral connection; it can be a mechanical connection, or an electrical connection; it can be directly connected or indirectly connected through an intermediate medium, which can be the internal connection between two components. For the person skilled in the art, the specific meanings of the above terms in the present invention can be understood according to particular circumstances.

Embodiment 1

Figure 1:
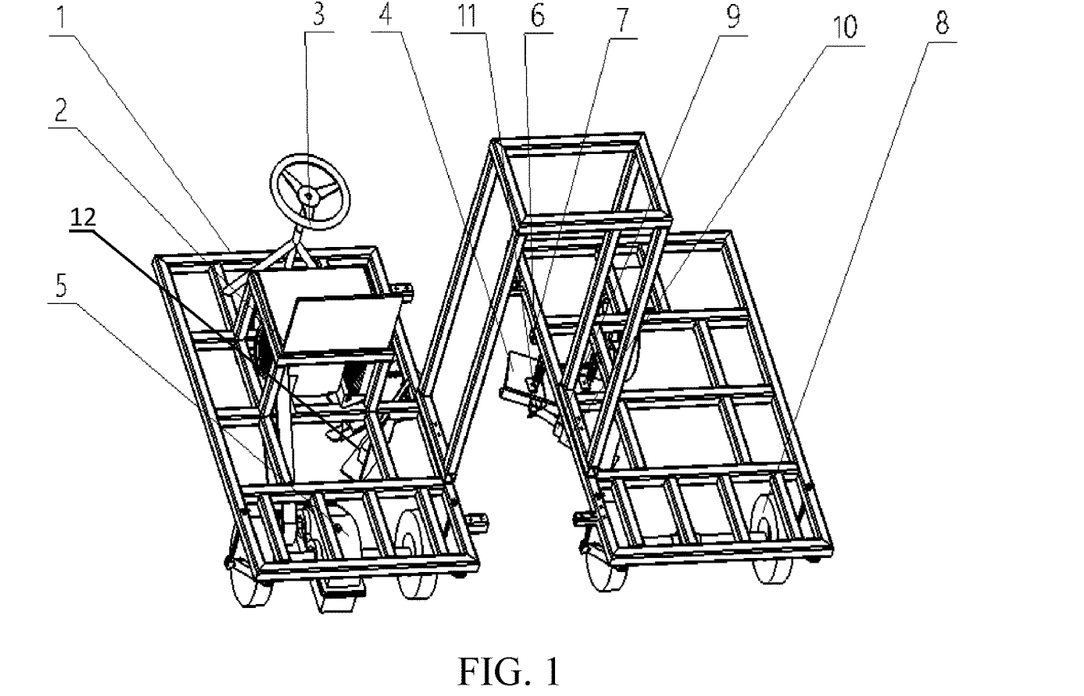
FIG. 1 is a schematic structural view of a two-way soil clearing device for a single-ridge grapevine according to an embodiment of the present invention.

FIG. 1 shows a preferred embodiment of the two-way soil clearing device for a single-ridge grapevine according to the present invention, which comprises a frame part 1, a soil clearing mechanism 4, a distance measuring sensor 6, an expansion and contraction device and a control unit 12.

Figure 2:
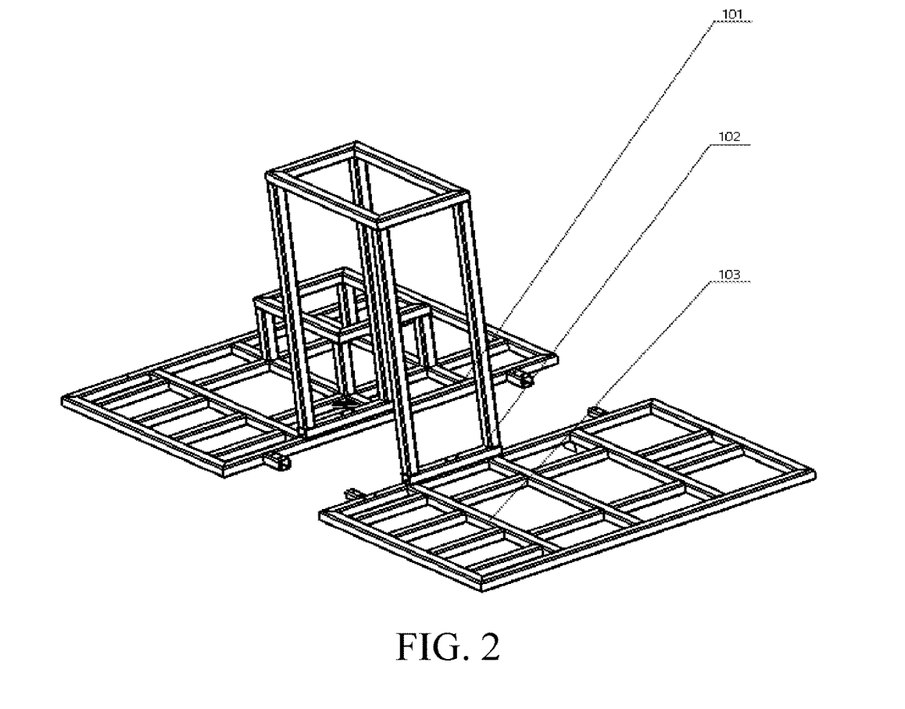
FIG. 2 is a schematic view of a frame of a two-way soil clearing device for a single-ridge grapevine according to an embodiment of the present invention.

As shown in FIG. 2, the frame part 1 comprises a frame and a connecting device 102; the frame includes a left side frame 101 and a right side frame 103; the left side frame 101 and the right side frame 103 are laterally connected by the connecting device 102; the left side frame 101 and the right side frame 103 are respectively provided with a soil clearing mechanism 4; the distance measuring sensor 6 is provided in front of the soil clearing mechanism 4; the left side frame 101 and the right side frame 103 are respectively provided with an expansion and contraction device, one end of the expansion and contraction device is connected to the frame at which side the expansion and contraction device is located, and the other end of the expansion and contraction device is connected to the soil clearing mechanism 4; the control unit 12 is connected with the distance measuring sensor 6 and the expansion and contraction device respectively.

Figure 3:
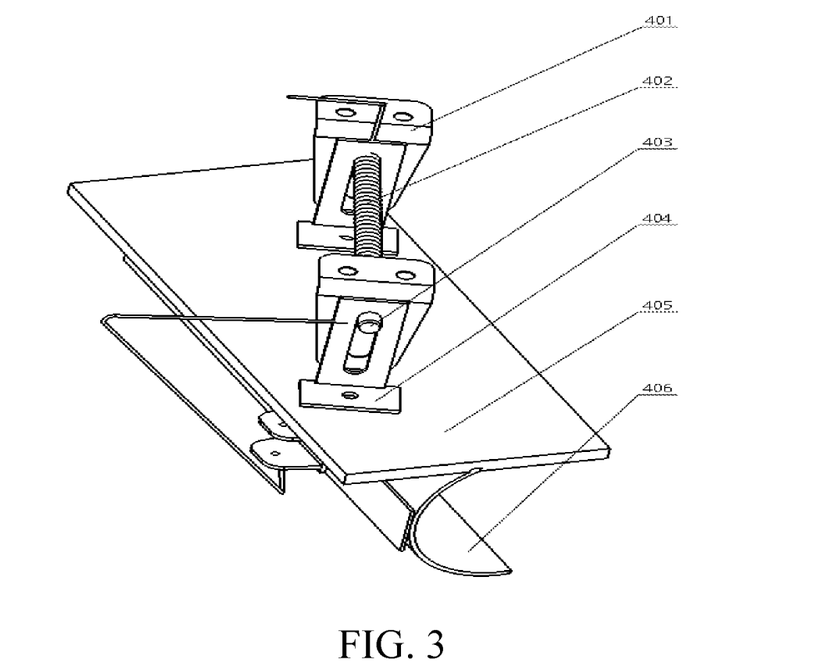
FIG. 3 is a schematic view of a soil clearing mechanism of a two-way soil clearing device for a single-ridge grapevine according to an embodiment of the present invention.

As shown in FIG. 3, according to this embodiment, preferably, the soil clearing mechanism 4 includes a scraper 406 and a reset mechanism; the upper part of the scraper 406 is rotatably connected to the frame at which side the scraper 406 is located; the reset mechanism is mounted on the upper part of the scraper 406, and when the scraper 406 is rotated by an external force, the reset mechanism resets the scraper 406.

According to this embodiment, preferably, the reset mechanism includes a torsional spring 402, a base plate 404 and a cylindrical pin 403; the two ends of the cylindrical pin 403 are rotatably connected with the through-holes at one end of the base plate 404 respectively; the other end of the base plate 404 is connected with the scraper 406; the torsional spring 402 is sleeved over the cylindrical pin 403.

According to this embodiment, preferably, the through-hole at one end of the base plate 404 is a longitudinally arranged through-groove, the height between the scraper 406 and the ground can be adjusted according to the height of the soil ridge, which improves the efficiency of soil clearing.

According to this embodiment, preferably, the soil clearing mechanism 4 further includes a chute plate 405; the chute plate 405 is provided on the top of the scraper 406, the top of the scraper 406 is slidingly connected with a chute at the bottom of the chute plate 405, the reset mechanism is connected with the chute plate 405.

According to this embodiment, preferably, both ends of the cylindrical pin 403 are also rotatably connected with the lower part of a lifting lug 401, and the upper part of the lifting lug 401 is connected with the frame at which side the lifting lug 401 is located.

According to this embodiment, preferably, the distance measuring sensor 6 is provided on a mounting frame 7, and the mounting frame 7 is respectively welded to the frame at which side the mounting frame 7 is located. The distance measuring sensor 6 detects the distance between the soil ridge and the distance measuring sensor 6, and transmits it to the control unit 12, the control unit controls the expansion and contraction device to adjust the distance between the scraper 406 and the soil ridge, so that the scraper automatically adjusts the soil clearing depth, trying to avoid the damage of the grapevine roots by the deep soil clearing, improving the covering soil clearing rate and reducing the damage rate of the grapevine, and the degree of intelligence is higher.

Figure 4:
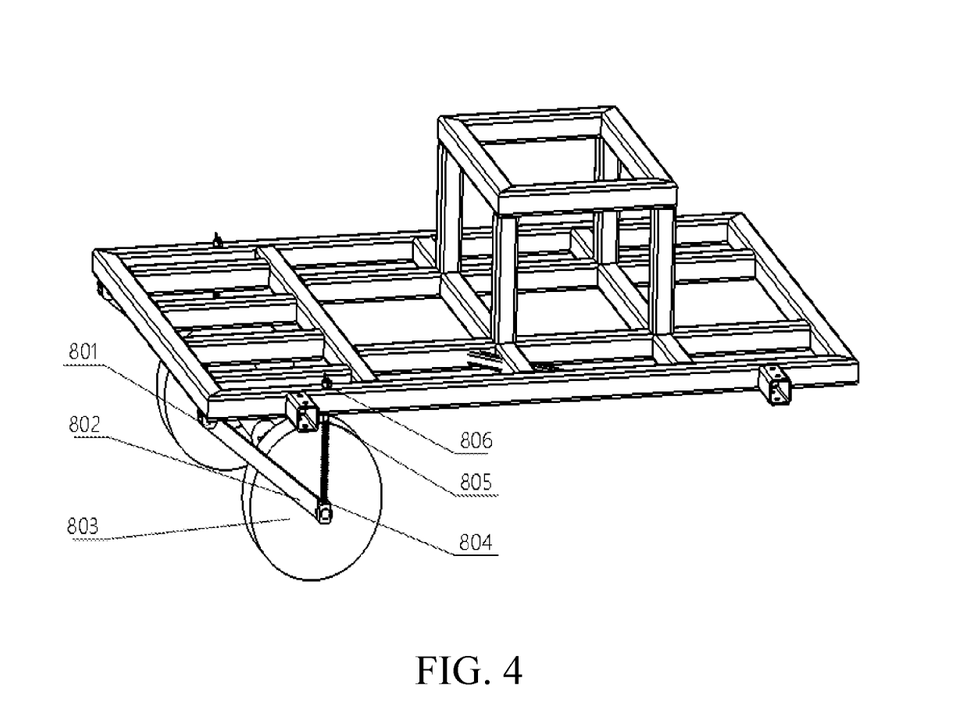
FIG. 4 is a schematic view of a depth limiting mechanism of a two-way soil clearing device for a single-ridge grapevine according to an embodiment of the present invention.

As shown in FIG. 4, according to this embodiment, preferably, the left side frame 101 and the right side frame 103 are further provided with a depth limiting mechanism 8 respectively; the depth limiting mechanism 8 includes a driving wheel 803, a telescopic shaft 805, a support rod 802, a support rod connector 801 and an elastic component 804; the driving wheel 803 is connected with the frame at which side the driving wheel 803 is located through the telescopic shaft 805 and is fastened by a nut; the elastic component is sleeved over the telescopic shaft 805. One end of the support rod 802 is connected with the frame at which side the support rod 802 is located through the support rod connector 801, and the other end of the support rod 802 is connected with the components of the driving wheel 803 to achieve the function of strengthening the support. The nut is a butterfly nut 806, and the elastic component 804 is a compression spring. The depth-limiting wheel can adjust height according to the unevenness of the ground, which can make the machine get effective walking support during the advancing process, and ensure that the scraper is stable at the working height.

According to this embodiment, preferably, the expansion and contraction device includes a pallet 10, a fixed mounting plate 11 and a telescopic electric cylinder 9. One end of the telescopic electric cylinder 9 is welded to the frame at which side the telescopic electric cylinder 9 is located through the pallet 10, the other end of the telescopic electric cylinder 9 is connected with the scraper 406 through the fixed mounting plate.

According to this embodiment, preferably, the connecting device 102 is a gantry-type frame structure, and is convenient for disassembly.

According to this embodiment, preferably, the scraper 406 is a curved scraper structure.

According to this embodiment, preferably, the left side frame 101 and the right side frame 103 are detachably connected in longitudinal direction.

According to this embodiment, preferably, the control unit 12 is a Programmable Logic Circuit (PLC).

Embodiment 2

A construction machine includes the two-way soil clearing device for a single-ridge grapevine described in Embodiment 1, which has the beneficial effects of Embodiment 1 and is not described here in detail.

According to this embodiment, preferably, the construction machine is a two-way riding type soil clearing machine for a single-ridge grapevine.

The construction machine further includes a seat 2, a steering mechanism 3 and a driving walking system 5; the seat 2, the steering mechanism 3 and the driving walking system 5 are all mounted on the frame. The construction machine also includes components for braking and clutching, which are used to realize the normal operation of the construction machine.

According to this embodiment, preferably, the construction machine further includes a wind power device; the wind outlet of the wind power device is located behind the soil clearing mechanism 4.

Figure 5:
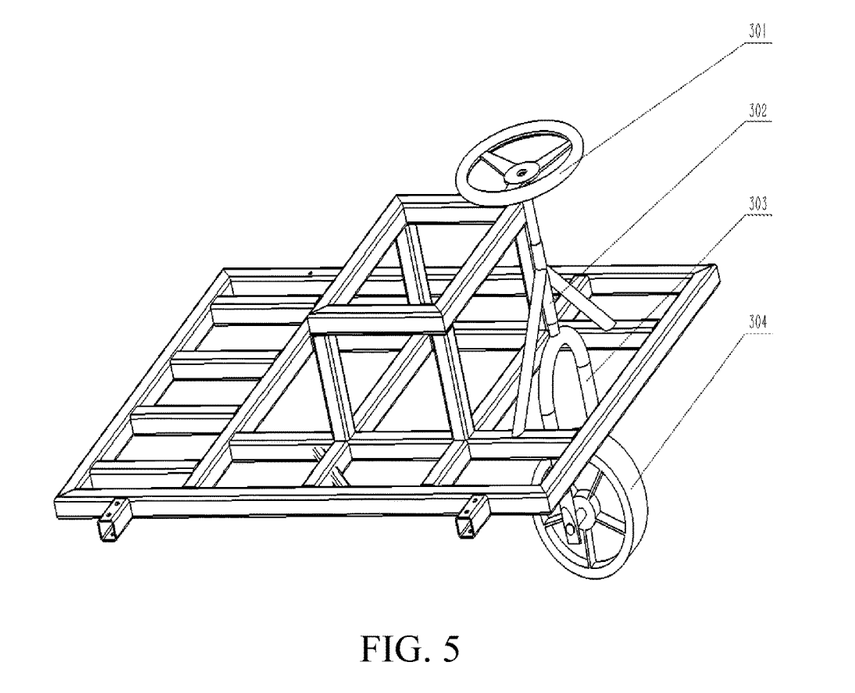
FIG. 5 is a schematic view of a steering mechanism of a two-way soil clearing construction machinery for a single-ridge grapevine according to an embodiment of the present invention.

As shown in FIG. 5, the steering mechanism 3 includes a front wheel rod 303, a front wheel 304, a sleeve 302, and a steering wheel 301. The front wheel 304 is arranged in the middle ahead of the frame, and the steering wheel 301 is located in front of the seat 2, the front wheel rod 304 is fixedly connected to the steering wheel 301, the sleeve is sleeved over the front wheel rod 303, and is fixedly connected to the left side frame 101.

According to this embodiment, preferably, the front wheels of the right side frame 103 are universal wheels.

Figure 6:
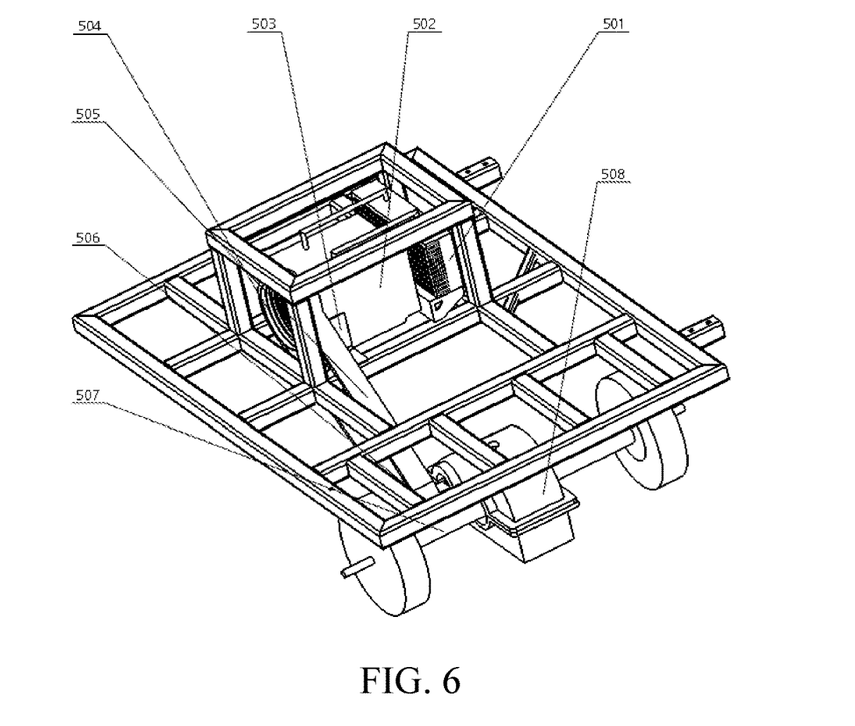
FIG. 6 is a schematic view of a driving walking system of a two-way soil clearing construction machinery for a single-ridge grapevine according to an embodiment of the present invention.

According to this embodiment, preferably, the transmission shaft 507 is a stepped shaft.

According to this embodiment, preferably, the frame part and the connecting device are made of square steel, which not only reduces the weight of the whole machine, but also ensures that the chassis has sufficient strength and rigidity.

As shown in FIG. 6, preferably, the left side frame 101 of the two-way soil clearing device for a single-ridge grapevine is provided with a driving walking system 5, the driving walking system 5 provides power for the soil clearing machine.

According to this embodiment, preferably, the driving walking system 5 includes an exhaust fan 501, a fixing plate 503, a diesel engine 502, a belt 505, belt pulleys, a gearbox 508, and a transmission shaft 507, the exhaust fan 501 is fixedly connected with the diesel engine 502, the fixing plate 503 is bolted to the left side frame 101, and is fixedly connected to the diesel engine 502, the diesel engine 502 is placed under the seat 2, the belt pulley I 504 is mounted on the diesel engine, and the belt pulley II 506 thereof is mounted on the gearbox 508. The gearbox 508 is mounted on the transmission shaft 507, and the power output from the diesel engine 502 is transmitted to the gearbox 508 via the belt pulley I 504, the belt 505, and the belt pulley II 506 sequentially, the gearbox 508 drives the driving wheels 803 through the transmission shaft 507 to travel.

According to this embodiment, preferably, the present invention can be well combined with a wind-blowing type soil clearing machine, and the soil clearing mechanism scrapes the covering soil, which not only creates favorable conditions for the air-blowing type soil clearing device, but also reduces the labor intensity for the subsequent grapevine raising operation.

Figure 7:
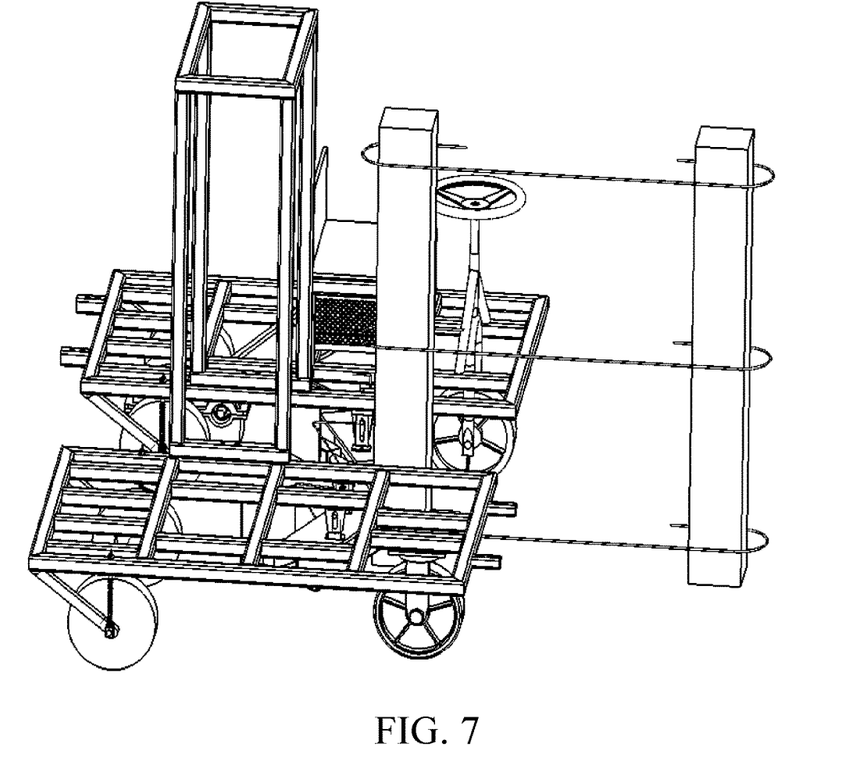
FIG. 7 is a schematic working view of a two-way soil clearing device for a single-ridge grapevine according to an embodiment of the present invention.
Figure 8:
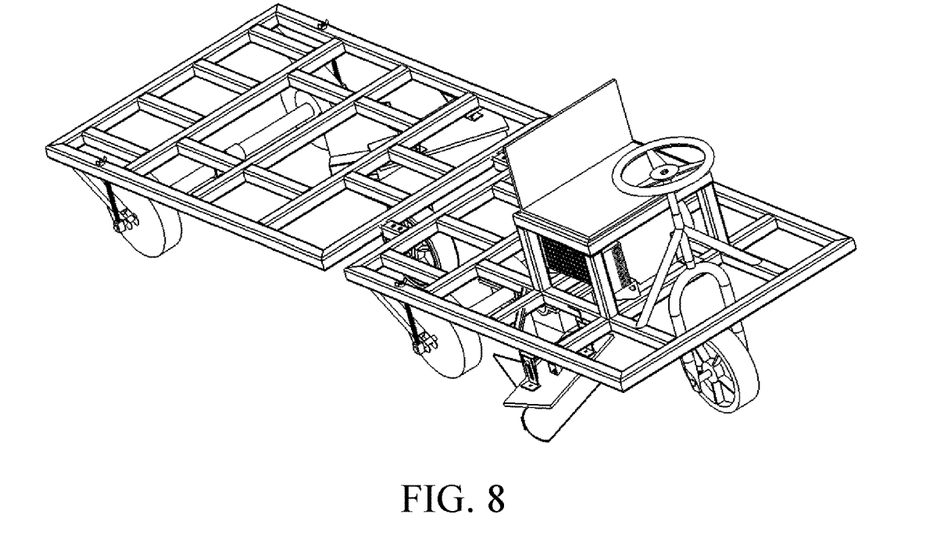
FIG. 8 is the schematic assembly view of the longitudinal connection between the left side frame and right side frame of a two-way soil clearing device for a single-ridge grapevine according to an embodiment of the present invention.

As shown in FIG. 7, it is a schematic view of the working of a riding type two-way soil clearing device for a single-ridge grapevine according to the present invention. The soil clearing device works on both sides of the stone pillar through the connecting device 102, so as to realize the function of clearing the covering soil on both sides of the single-ridge;

As shown in FIG. 8, it is a schematic assembled view of the left side soil clearing machine and the right side soil clearing machine after removing the connecting device 102, which provides convenience for the driver to operate and facilitate transportation;

The working process of the present invention is:

After the diesel engine 502 is started and the rotation speed is stabilized, the driver operates the steering mechanism 3 to drive the driving wheel 803 along the ridge. The power output from the diesel engine 502 is transmitted to the gearbox 508 through the belt pulleys, and the gearbox 508 drives the driving wheel 803 to walk. By controlling the movement of the left side frame 101, the other side frame is driven through the connecting device 102, so as to the function of working on the left side and right side of the ridge at the same time of the soil clearing machine is realized. According to the current situation of burying grapevine in winter, the ground height of the left side frame 101 and the right side frame 102 is adjusted by adjusting the butterfly nut 806, and the working height of the scraper 406 is adjusted by the connection of the U-shaped through-groove of the base plate 404 and the lifting lug 401. When the soil clearing machine for the grapevine is working, the two sides of the ridge are operated at the same time, and the buried soil over the grapevines on both sides of the soil ridge are removed at the same time. The scraper 406 is used to simultaneously scrape off the covering soil on both sides of the soil ridge. According to the actual height of the soil ridge, the height between the scraper 406 and the ground is adjusted to improve the efficiency of soil clearing; the distance between the soil ridge and the distance measuring sensor 6 is detected by the distance measuring sensor 6, and transmitted to the PLC, the PLC controls the telescopic electric cylinder 9 to adjust the distance between the scraper 406 and the soil ridge, achieving the function of infinite access to the grapevine without damaging the roots; when the scraper 406 is subjected to a large resistance, it can swing and avoid by compressing the torsional spring 402 to ensure the safety of the scraper 406 and the stability of the whole machine. Through the action of the soil clearing mechanism 4, the covering soil over the grapevines is finally removed, and the soil is scraped to the grape rows, for burying the grapevines in the next winter, and the whole operation process is completed. After the operation is completed, the connecting device 102 can be removed, and the left side frame and right side frame are assembled by bolts connection, which provides convenience for the driver to operate and facilitates transportation.

The soil clearing mechanism and the depth limiting mechanism of the present invention have height adjustment devices, which are easy to meet the needs of different working environments. A reset mechanism is mounted on the soil clearing mechanism. When subjected to a large resistance, the scraper can swing to avoid and reset. The present invention replaces the manual removal of the covering soil over the grapevines, and can flexibly remove the covering soil between the piles of the grapevines and the soil at the sides of the grapevines at one time. It can operate on both sides of the same soil ridge at the same time during work, which greatly improves the work efficiency, moreover, the operation is simple, the production cost is relatively low, and the cost of planting grapes is reduced, and the problems of the soil clearing machine combined with the existing traditional tractor, such as small ground clearance, low transmission efficiency, high failure rate, and inability to perform two-way soil clearing at one time, are effectively solved.

It should be understood that although the specification is described in accordance with each embodiment, not each embodiment contains only one independent technical solution. This description of the specification is only for clarity, and the person skilled in the art should take the specification as a whole. The technical solutions in each embodiment can also be appropriately combined to form other embodiments that can be understood by the person skilled in the art.

The series of detailed descriptions above are only specific descriptions of the feasible embodiments of the present invention. They are not intended to limit the scope of protection of the present invention. Any equivalent embodiments or modifications made without departing from the technical spirit of the present invention shall be included in the protection scope of the present invention.

The invention claimed is:

1. A two-way soil clearing device, configured to be used with a single-ridge grapevine, the two-way soil clearing device comprising:
    a frame part;
    a soil clearing mechanism,
    a distance measuring sensor,
    an expansion and contraction device; and
    a control unit;
    wherein the frame part comprises a left side frame and a right side frame that are laterally connectable by a connecting device that is removeable from the frame part, such that the left side frame and the right side frame are attachable in a longitudinal direction;
    wherein the soil clearing mechanism is arranged on the left side frame and the right side frame and comprises,
    a chute plate that has a top side and bottom side;
    a scraper connected to the bottom side of the chute plate;
    a reset mechanism mounted on the top side of the chute plate that resets the scraper, position, wherein the reset mechanism comprises,
    a torsional spring, at least one base plate, at least one lifting lug, and a cylindrical pin arranged therebetween, wherein the base plate and the lifting lug connect to the top side of the chute plate to the frame part and the torsional spring is sleeved over the cylindrical pin between the at least one lifting lug and the at least one base plate;
    wherein the distance measuring sensor is arranged on a respective left side frame and right side frame in a location in front of the soil clearing mechanism arranged on the same respective left side frame and right side frame;
    wherein the expansion and contraction device is attached to the frame part behind the soil clearing mechanism, the expansion and contraction device comprising,
    a fixed mounting plate arranged on the scrapper,
    a telescopic electric cylinder comprising one end that is attached to the frame part and another end that is operably connected to the fixed mounting plate on the scraper;
    wherein the control unit is connected to the distance measuring sensor and the expansion and contraction device, such that control device is configured to receive from the distance measuring sensor a distance between the scraper and the soil and adjusts the telescopic electric cylinder accordingly to rotate the scraper on the cylindrical pin to adjust a depth of the scraper in the soil and when the scraper is subjected to a resistance, the scraper swings away from the resistance on the cylindrical pin, which compresses the torsional spring until the resistance is passed and the torsional spring resets the position of the scraper.

2. The two-way soil clearing device, according to claim 1, further comprising a construction machine on which the two-way soil clearing device is mounted to move the left side frame and the right side frame when joined by the connecting device or when arranged in the longitudinal direction.

3. The two-way soil clearing device, according to claim 2, wherein the construction machine further comprises a steering mechanism and a driving walking system that are mounted on the frame part.

4. The two-way soil clearing device according to claim 1, wherein the connecting device comprises a gantry frame structure.

* * * * *